Oct. 16, 1956 S. HANSEN 2,767,345

ELECTROSTATIC STORAGE DEVICES

Filed Jan. 12, 1952 4 Sheets-Sheet 1

INVENTOR.
SIEGFRIED HANSEN,
BY Nicholas T Volsk
ATTORNEY.

INVENTOR.
SIEGFRIED HANSEN,
BY Nicholas T Volsk
ATTORNEY.

Oct. 16, 1956 S. HANSEN 2,767,345

ELECTROSTATIC STORAGE DEVICES

Filed Jan. 12, 1952 4 Sheets-Sheet 3

INVENTOR.
SIEGFRIED HANSEN,
BY Nicholas T Volk
ATTORNEY.

ELECTROSTATIC STORAGE DEVICES

Filed Jan. 12, 1952 4 Sheets-Sheet 4

INVENTOR.
SIEGFRIED HANSEN,
BY Nicholas T Volsn
ATTORNEY.

United States Patent Office 2,767,345

Patented Oct. 16, 1956

2,767,345

ELECTROSTATIC STORAGE DEVICES

Siegfried Hansen, Los Angeles, Calif., assignor, by mesne assignments, to Hughes Aircraft Company, a corporation of Delaware Application January 12, 1952, Serial No. 266,138

24 Claims. (Cl. 315—12)

This invention relates to electrostatic storage systems and more particularly to memory tube systems for use in regenerating the charges on a series of spots on the tube or storing a new series of charges on a series of previously charged spots while simultaneously producing an output signal representing the previous charges.

In the digital computer art, memory tubes are employed as the principal components of electrostatic storage devices for storing a series of binary digits in the form of a corresponding series of charged spots, respectively, on the screen of the tube. Generally, the charge on any spot may have one of two values representing the two binary digits, respectively. Owing to the loss of charge with time through electron redistribution, transverse leakage, etc., with the resultant loss of the stored digital information, it is necessary to regenerate the charge on each of the spots at regular intervals in order to retain the stored information for an indefinite period of time. Furthermore, in digital computer operations it is often required to derive an output signal representing the stored binary digits without disturbing the charges, or to replace the stored charges with a new series of charges representing a new series of binary digits.

The prior art electrostatic storage devices generally have performed each of the above functions by at least two separate and distinct steps which, therefore, are time consuming and require additional equipment. For example, in performing the regenerating function, prior art devices regenerate the spot charges by a first operation, and produce an output signal representing the charges by a second operation. Similarly, the prior art devices require at least three distinct operations to perform the function of storing a new series of binary digits and producing an output signal representing the previously stored charges. For example, to perform this latter function, the prior art devices sample the charge of each spot to produce an output signal representing the charge, erase the spot in another operation, and then store the new binary digit on each erased spot by still another operation.

The present invention discloses memory tube electrostatic storage systems which overcome the above and other disadvantages of the prior art devices in performing each of the above-noted functions. In particular, the systems of the present invention automatically and simultaneously produce, upon the regeneration of the charge of each spot, an output signal having a voltage level corresponding to the binary digit represented by the stored charge. Furthermore, the system of the present invention is capable of storing a new series of binary digits directly on a series of previously charged spots, and simultaneously, with the storage of each new digit, producing an output signal representing the charge previously stored on the spot. In this manner, each desired function is performed in a single operation by the systems of the present invention.

Two embodiments of the present invention are illustrated, one employing a conventional cathode ray tube as the memory tube and the other employing a conventional storage tube as the memory tube. In both systems, the binary digits are represented by the output voltage levels of a flip-flop and each spot is charged in accordance with the level of the voltage during the charging period. The manner of control of the flip-flop determines the function which the device performs. Thus, if it is desired to store a new series of digits, the flip-flop is set to produce appropriate output voltage level signals by signals representing the new digits to be stored. If it is desired to regenerate previously stored charges, the flip-flop is set by signals derived from the previously stored charges, and thus each spot may be recharged to its exact initial charge value before leakage, etc., causes a deviation therefrom. During the storage of a new series of binary digits on a series of spots which had been previously charged to represent a previous series of digits, or during the regeneration of a previously stored series of spots, an output signal representing the previous series of digits is produced by a mixing network which mixes the output signal from the flip-flop and a signal derived from the charging of the spot to its new charge.

According to the present invention, there is provided an electrostatic storage device including a memory tube; actuable means responsive to applied signals for producing a first output signal to control the storing of charges within the memory tube; output means for producing a second output signal when the charge being stored on a spot does not correspond to the charge previously stored thereon; first selectively operable means for applying said second output signal to said actuable means to actuate said actuable means to restore a previous charge level on a spot; second selectively operable means for actuating said actuable means to store a new charge level on a spot; and means for combining said first and second output signals to produce a third output signal representing the previous charge on a particular spot.

Therefore, an object of the present invention is to provide a system for selectively either regenerating the previous charge on a spot on the storage electrode of a memory tube, or storing a new charge on the spot while, simultaneously therewith, producing an output signal representing the previous charge.

Another object of the present invention is to provide a system for selectively either regenerating the previous charge on a spot on the storage electrode of a memory tube and producing an output signal representing the previous charge, or storing a new charge on the spot while simultaneously therewith producing an output signal representing the previous charge, the previous charge being either a relatively positive or a relatively negative charge level and the new charge being either said positive or said negative charge level.

A further object of the present invention is to provide a system for regenerating the charge on a spot on the storage electrode of a memory tube, said spot having been previously charged to either a relatively positive or a relatively negative charge level and, simultaneously therewith, producing an output signal representing the charge level.

A still further object of the present invention is to provide a system for regenerating the charge on a spot on the phosphorescent layer of a cathode ray tube, said tube having an external conductive coating adjacent the layer and said spot having been previously charged to either a relatively positive or a relatively negative charge level.

A still further object of the present invention is to provide a system for regenerating the charge on a spot on the target electrode of a storage tube, said spot having been previously charged to either a relatively positive or a relatively negative charge level.

Another object of the present invention is to provide a system for simultaneously storing a new charge on a previously charged spot on the storage electrode of a memory tube, and producing an output signal representing the previous charge.

Still another object of the present invention is to provide a system for storing a new charge on a spot on the phosphorescent layer of a cathode ray tube, said spot having been previously charged to either a relatively positive or a relatively negative charge level and the new charge being either of said positive and negative charge levels, said device producing an output signal representing the previous charge simultaneously with the storage of the new charge.

Still another object of the present invention is to provide a system for storing a new charge on a previously-charged spot on the target electrode of a storage tube and, simultaneously producing an output signal representing the previous charge.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
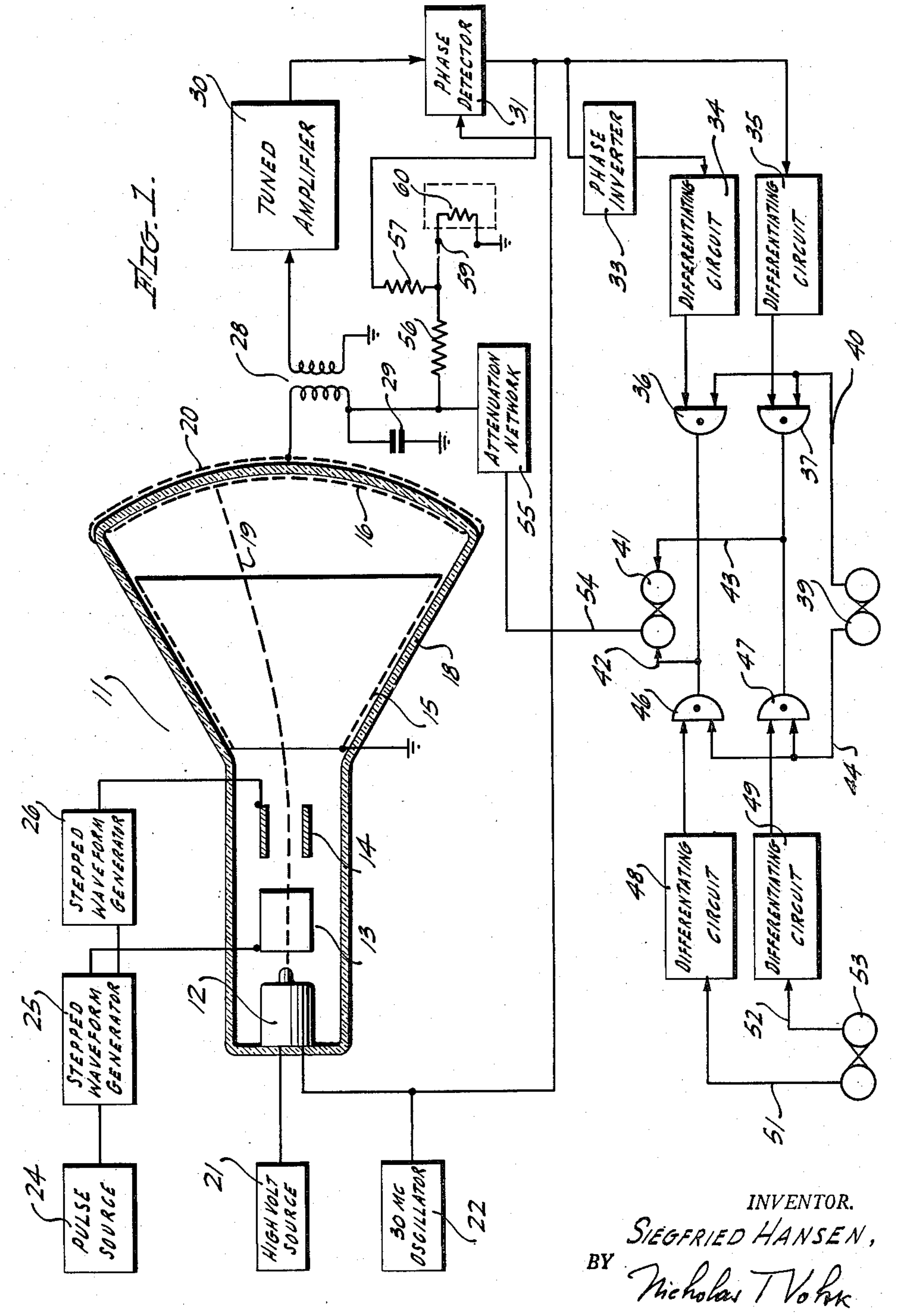
Fig. 1 is a circuit diagram of one embodiment according to the present invention.

Referring now to Fig. 1, there is illustrated one embodiment of the present invention including a cathode ray tube 11 having an electron gun 12, horizontal deflection plates 13, and vertical deflection plates 14, all sealed within a glass envelope 18. Also included in tube 11 are a collector electrode 15 and a phosphorescent layer 16, both applied as coatings on the inner surface of glass envelope 18. Applied to the outer surface of envelope 18, opposite layer 16, is a coating 20 of conductive material, such as an "Aquadag" coating, a colloidal dispersion of finely ground graphite manufactured by the Acheson Colloids Company of Port Huron, Michigan. A source 21 of high voltage and a source of high frequency energy, such as a 30 megacycle oscillator 22, are coupled to electron gun 12, source 21 and oscillator 22 producing through gun 12 a 30 megacycle current-modulated electron beam 19 which strikes phosphorescent layer 16.

A pulse source 24 has its output terminal connected to the input terminal of a first stepped waveform generator 25, the stepped waveform output signal of which is applied to horizontal deflection plates 13. A second stepped waveform generator 26 has its input terminal connected to the output terminal of generator 25, the stepped waveform output signal of generator 26 being applied to vertical deflection plates 14. The connection between generators 25 and 26 is so arranged that the output signal of generator 25 completes a full cycle of steps during the interval that the output signal of generator 26 completes a single step in cycle. One such arrangement is disclosed in copending United States application for patent, Serial No. 241,997, filed August 15, 1951, for "Stepped Signal Producing System" by Siegfried Hansen, now Patent No. 2,709,770. The application of the respective output signals to the deflection plates of cathode ray tube 11 causes beam 19 to strike layer 16 in a series of spots, one spot being produced by each step of the output signal of generator 25, and one line of spots being produced by each step of the output signal of generator 26.

A first end of the primary winding of a transformer 28 is coupled to coating 20, while the second end of the primary winding is coupled to ground through a capacitor 29. The secondary winding of transformer 28 has one end coupled to a tuned amplifier 30, and the other end coupled to ground. The output signal of amplifier 30 and the output signal of oscillator 22 are applied to the two input terminals, respectively, of a phase detector 31. Amplifier 30 is a conventional tuned amplifier and is tuned to amplify a 30 megacycle signal. Phase detector 31 may be of the type illustrated in Fig. 218 on page 332 of the book "Principles of Radio Engineering" by R. S. Glasgow, published in 1936 by the McGraw-Hill Book Company, New York and London, in which the output signal of amplifier 30 is applied at B, the signal from oscillator 22 at A, and the output of the detector taken at D, where A, B and D are points in the circuit diagram found in Fig. 218, of the cited reference.

The output terminal of detector 31 is connected to the input terminal of a first differentiating circuit 34 through a phase inverter 33, and is connected directly to the input terminal of a second differentiating circuit 35. The output terminals of differentiating circuits 34 and 35 are coupled to one input terminal of each of two-terminal "and" gate circuits 36 and 37, respectively. Each of circuits 36 and 37 has its other input terminal connected to an output conductor 40 of a device 39 for producing an output signal of alternate relatively high and low voltage levels. The output terminals of circuits 36 and 37 are coupled to input conductors 42 and 43, respectively, of a device 41 similar to device 39.

Devices 39 and 41 each may be a conventional flip-flop which produces a first output signal of alternate voltage levels on a first output terminal and a second output signal, of levels complementary to those of the first output signal, on a second output terminal. For example, as shown in Fig. 1, device 39 is a flip-flop which produces its first and second output signals on conductor 40 and a conductor 44, respectively. Similarly, device 41 is a flip-flop which produces its alternate voltage levels in response to negative input signals being applied alternately to input conductors 42 and 43. Only one input signal of flip-flop 41 is utilized in the circuit of Fig. 1, this output signal appearing on an output conductor 54.

Output conductor 44 of flip-flop 39 is coupled to one input terminal of each of two-terminal "and" gate circuits 46 and 47, the output terminals of circuits 46 and 47 being coupled to input conductors 42 and 43, respectively, of flip-flop 41. The other input terminal of circuit 46 is coupled through a differentiating circuit 48 to one output conductor 51 of the flip-flop 53, while the other input terminal of circuit 47 is coupled through a differentiating circuit 49 to the other output conductor 52 of flip-flop 53.

Output conductor 54 of flip-flop 41 is coupled through an attenuation network 55 to the second end of the primary winding of transformer 28. This second end of the primary winding is also coupled to an output terminal 59 through a mixing resistor 56, the output terminal of phase detector 31 being coupled to output terminal 59 through another mixing resistor 57. A resistive load device 60 is illustrated as connected between output terminal 59 and ground.

A storage device, according to Fig. 1, may perform any of the following functions: store a series of binary digits in the form of charges on a series of spots on phosphorescent layer 16 contacted by beam 19; regenerate the charge on each of a series of spots already charged to thereby maintain, indefinitely, the storage of a series of binary digits; or store a new charge on each of a series of spots to represent a new series of binary digits while simultaneously producing signals representing the previously stored binary digits. The levels of the output signals of flip-flop 39 determine the particular function to be performed by the storage device.

Figure 2:
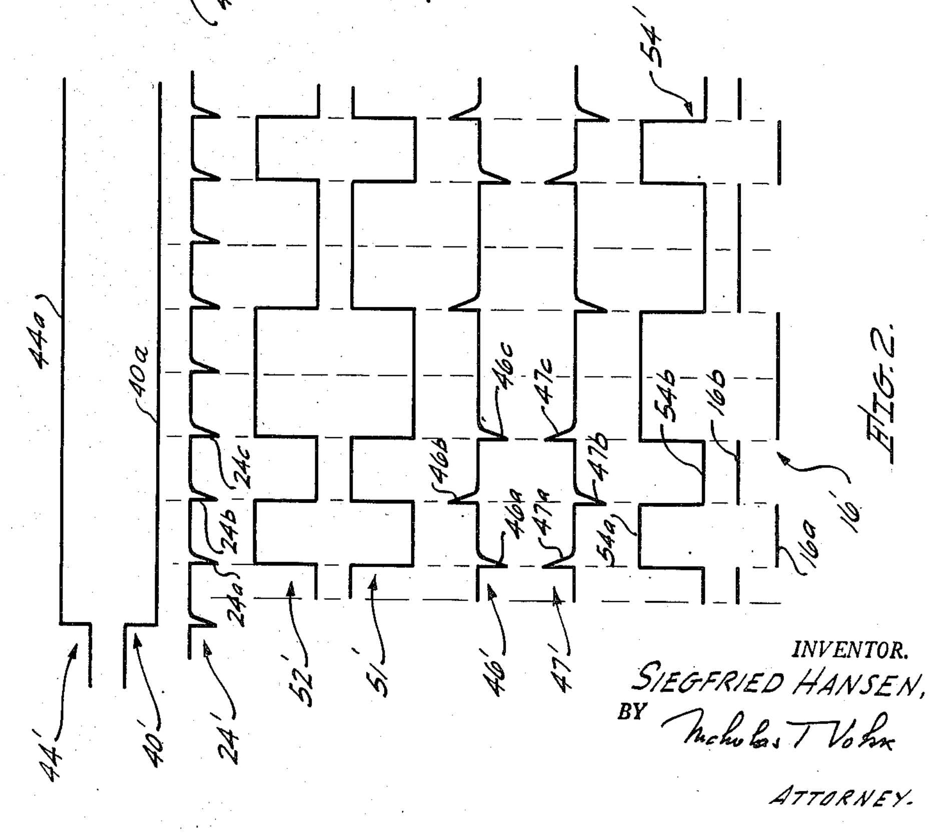

Referring now to Fig. 2, there is shown a composite diagram of the waveforms of signals occurring at various points in the circuit of Fig. 1 during the interval in which the storage device is performing the first-mentioned function, that is, the storage of a series of binary digits. During this interval, the signal, generally designated 44', appearing on output conductor 44 of flip-flop 39, is at a high voltage level 44a. At the same time, the signal, generally designated 40', appearing on output conductor 40 of flip-flop 39 is at a low voltage level 40a. Level 44a of signal 44' is of sufficient amplitude to open gate circuits 46 and 47, while level 40a of signal 40' is insufficient to open circuits 36 and 37.

The binary digits to be stored are represented by the high and low voltage levels of the signal, generally designated 52' in Fig. 2, produced on output conductor 52 of flip-flop 53. The low voltage level may, by definition, represent the binary digit 0, while the high voltage level represents the binary digit 1. The signal, generally designated 24' of Fig. 2, is the output signal of pulse source 24, and includes a series of negative pulses occurring at regular intervals. As will be apparent from the discussion of the operation of pulse source 24, and waveform generators 25 and 26 as found in the before-mentioned application for patent Serial No. 241,997, each successive pulse produced by source 24 results in a different step being produced by generator 25 which, in turn, causes electron beam 19 to strike a different spot on layer 16. Thus, since the voltage levels of signal 52' occur during the successive interpulse intervals of signal 24', it is apparent that the charging voltage applied to tube 11 will be constant during the interval that beam 19 strikes a given spot on layer 16.

The signal appearing on output conductor 51 of flip-flop 53 is designated generally as 51' in Fig. 2, and includes voltage levels complementary to the levels of signal 52'. Signals 51' and 52' are differentiated by circuits 48 and 49, respectively, to produce signals 46' and 47', respectively. As shown in Fig. 2, signal 46' includes a series of alternately negative and positive polarity pulses, each pulse being aligned in time with a transition point of signal 51' from one level to another. Similarly, signal 47' includes a series of alternately positive and negative polarity pulses corresponding to the transition points, respectively, of signal 52'. The pulses of signal 46' occur simultaneously with the pulses of signal 47', but are of opposite polarity. Signals 46' and 47' are applied to gate circuits 46 and 47, respectively.

Each of gate circuits 46 and 47 may be of the type illustrated in Fig. 1 of copending United States Application for Patent, Serial No. 245,860, filed September 10, 1951, for "High Speed Flip-Flop Counters" by Eldred C. Nelson, and as such, pass only negative pulses when opened. Thus, negative pulse 46a of signal 46' is passed by circuit 46 to input conductor 42. Pulse 46a triggers flip-flop 41 to produce a high voltage level 54a of the signal 54' on output conductor 54 during the first interpulse interval. Pulse 47a of signal 47', appearing simultaneously with pulse 46a, is not passed by gate circuit 47 owing to its positive polarity, and hence, has no effect on the conduction state of flip-flop 41.

The second differentiated pulse 46b of signal 46' is of positive polarity and is blocked by circuit 46, but the second pulse 47b, of signal 47', is of negative polarity and is thus passed by gate circuit 47 to input conductor 43. Flip-flop 41 is thereby triggered to produce the low voltage level 54b of signal 54' during the second interpulse interval. The remaining voltage levels of signal 54' are formed by signals 46' and 47' in the manner explained for the first two interpulse intervals.

Signal 54' is attenuated by attenuation network 55, and the resultant attenuated signal is applied through the primary winding of transformer 23 to coating 20. Before proceeding further with the description of the manner by which the voltage levels of signal 54' are stored in the form of charges on layer 16, it will be helpful to review briefly the principal operational characteristics of cathode ray tube 11 when utilized as a memory tube.

Phosphorescent layer 16 has secondary emissive properties similar to the properties possessed by dielectric materials found on the target electrodes of conventional storage tubes. Any given spot on layer 16, when struck by electron beam 19, will emit a number of secondary emission electrons greater than the number of primary electrons originally present in the portion of beam 19 striking the given spot. These secondary emission electrons have two main paths of travel; they may be drawn to collector electrode 15, maintained at ground potential, or they may return to the same spot from which they were liberated. The proportion of the secondary emission electrons travelling to electrode 15 to those returning to the same spot on layer 16 is a function of the voltage applied to coating 20. Thus, if coating 20 were held at a positive 10-volt level, for example, a majority of the secondary emission electrons would be attracted, through condenser action between coating 20 and layer 16, back to the same spot from which they were initially liberated. Therefore, upon removal of the electron beam under such conditions, the given spot will contain more electrons than it had before being struck by the beam, and hence exhibit a relatively negative charge. If, however, coating 20 were maintained at just above ground potential, for example 1 volt positive, a greater proportion of the secondary emission electrons would be drawn to collector electrode 15 rather than to the spot from which they were liberated. Upon removal of the electron beam, the given spot would contain fewer electrons than it had before being struck by the beam, and hence exhibit a relatively positive charge. It is assumed here that the relatively positive charge represents the binary digit 0 and the relatively negative charge represents the binary digit 1.

Returning now to the description of the operation of the circuit of Fig. 1, attenuation network 55 is employed to reduce the high and low voltage levels of signal 54' to approximately 10 and 1 volts positive, respectively, by way of example. The pattern, generally designated 16' of Fig. 2, illustrates the charge levels placed on a series of spots on layer 16 by electron beam 19 under the control of the successive voltage levels of signal 54' after attenuation by attenuation network 55. The high voltage level 54a of signal 54' produces a relatively negative charge level 16a of pattern 16' on the first spot contacted while the low voltage level 54b of signal 54' produces a relatively positive charge level 16b of pattern 16' on the second spot contacted, etc. A comparison of signal 52', representing the series of digits to be stored, and pattern 16' reveals that the charge on each spot corresponds to the voltage level of signal 52' during the interval that beam 19 is striking the spot. A relatively positive charge corresponds to a low voltage level of signal 52', while a relatively negative charge corresponds to a high voltage level of signal 52', representing, according to the conventions previously adopted, binary "0" and binary "1" digits, respectively.

Figure 3:
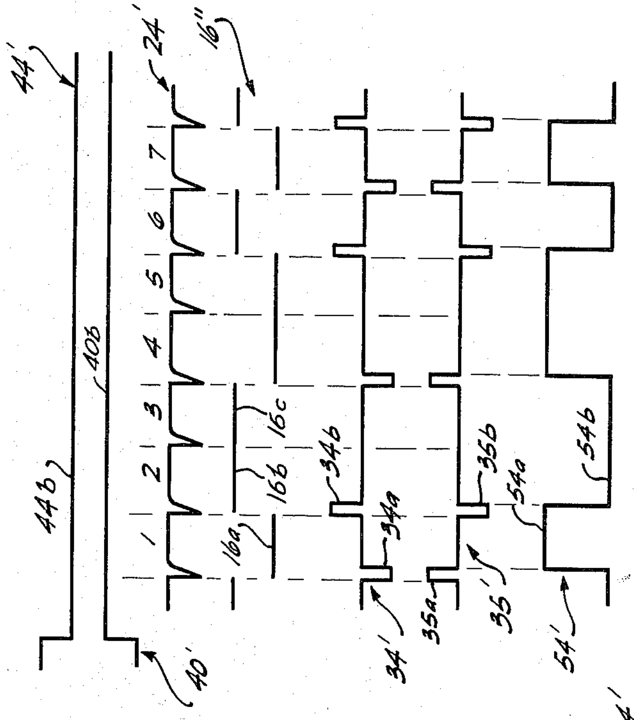
Figs. 2 to 4 are composite diagrams of waveforms of electrical signals appearing at various points in the device according to Fig. 1.

The second-mentioned function capable of being performed by the storage device of Fig. 1 is that of regenerating the charges previously stored on a series of spots, and the manner in which this result is accomplished is illustrated by the signal waveforms shown in Fig. 3. Under ordinary conditions, the spot charges will be dissipated in a reasonably short period of time owing to the transverse leakage of phosphorescent layer 16, electron redistribution, etc. Accordingly, if the binary digits thus stored are to be retained indefinitely, the charge of each spot must be regenerated or brought back to its original value at occasional intervals.

For the purposes of this explanation, assume that the group of consecutive spots represented by charge pattern 16'' of Fig. 3, are to be rescanned by beam 19, and the charge on each of these spots regenerated or brought back to its initial value. To carry out this function, flip-flop 39 is triggered so that signal 44' is at a low voltage level 44b and signal 40' is at a high voltage level 40b, as shown in Fig. 3. Signal 24' is illustrated again in Fig. 3, in order to permit a clearer understanding of this function of the device.

Under the conditions outlined above, gate circuits 36 and 37 are open and gate circuits 46 and 47 are closed. Accordingly, the state of flip-flop 53 is immaterial to the regenerating function of the storage device of Fig. 1, and the state of flip-flop 41 is controlled by the signals appearing at the output terminals of circuits 36 and 37. Since the level of signal 54' at the beginning of the regenerating function, is immaterial, it will be assumed that signal 54' is initially at its low voltage level.

Now, during the first interpulse interval of signal 24', beam 19 strikes the first spot of layer 16, this spot being charged to negative charge level 16a of pattern 16''. Since signal 54', applied through network 55 and the primary winding, is initially at its low voltage level, the spot tends to discharge toward the positive charge level. Owing to the 30 megacycle frequency of beam 19, a low capacity reactance exists between layer 16 and coating 20, and the change of charge on the spot is reflected through condenser action as a 30 megacycle current in the primary winding of coil 28. Capacitor 29 is of such value as to series resonate with the inductance of the primary winding of transformer 28 at the 30 megacycle frequency thereby causing an appreciable voltage drop to appear across transformer 28. This voltage drop is amplified by tuned amplifier 30, and the amplified signal thereof is detected by phase detector 31 to produce a signal corresponding to the envelope thereof. The 30 megacycle current flowing in the primary of transformer 28 when a spot is being charged in a positive direction will differ in phase from the current flowing when a spot is being charged in a negative direction, and, consequently, the output signal of phase detector 31 will be an indication of the change of charge a particular spot is undergoing.

The output signal of detector 31 is inverted by phase inverter 33 and the inverted signal is differentiated by differentiating circuit 34. The differentiated signal, generally designated 34' of Fig. 3, includes first pulse 34a of negative polarity corresponding to the initial change in charge.

The negative polarity of pulse 34a may be established by connecting phase detector 31 so that the output signal from the phase detector is of relatively negative polarity when a spot is being charged in a positive direction, and of relatively positive polarity when a spot is being charged in a negative direction.

Pulse 34a, upon being passed by gate circuit 36, triggers flip-flop 41 such that high voltage level 54a of signal 54' is produced on conductor 54. This high voltage level 54a, after attenuation by network 55, causes the charge on the first spot to return to its original negative charge level 16a of pattern 16''.

The second spot scanned by beam 19, during the second interpulse interval, had originally a positive charge level 16b. Since signal 54' is at its high voltage level 54a during this interval, a modulated change of charge signal is produced in transformer 28 of opposite phase from that produced when the first spot was contacted. Thus, a positive pulse 34b of signal 34' is produced at the output of differentiating circuit 34. Pulse 34b will not be passed by gate circuit 36 owing to its positive polarity. However, a corresponding negative pulse 35b appears simultaneously therewith in the complementary signal, generally designated 35' in Fig. 3, produced on the output conductor of differentiating circuit 35. Negative pulse 35b will be passed by gate circuit 37 and will trigger flip-flop 41 into its other conduction state, whereby a low voltage level 54b of signal 54' is produced during the second interpulse interval. This low voltage level corresponds to the original positive charge level 16b of pattern 16'' and thereby causes the spot to return to its original charge level.

The next or third spot had originally a positive charge level 16c, the same as level 16b, and the low voltage level 54b of signal 54' is thus retained during the third interpulse interval and thereby causes the spot to return to its initial charge level. The remaining portions of the signals and patterns illustrated in Fig. 3 may be readily understood from the explanation of the operation during the first three interpulse intervals, as set forth above.

When signal 54' is at the voltage level corresponding to the initial charge on a given spot, and the charge on the spot has deviated from its exact initial charge value, the subsequent recharging thereof back to its initial value will produce modulated charging currents in transformer 28 resulting in complementary pulses appearing in signals 34' and 35'. However, these pulses are of much smaller magnitude than the pulses produced when the conduction state of flip-flop 41 is initially reversed from that necessary to bring the charge of a given spot back to its original value, as described for the first and second spots of Fig. 3. The smaller recharging pulses will be of insufficient magnitude to trigger flip-flop 41 thus allowing the desired operation of the circuit as set forth above.

The signal appearing on output terminal 59 is a function of the voltages applied from detector 31 and attenuation network 55 to resistors 57 and 56, respectively, and the relative resistance values of resistors 56 and 57 and load device 60. If the resistances of resistors 56 and 57 are equal in value and each twice the value of the resistance of load device 60, the voltage appearing on terminal 59 is equal to one-fourth of the sum of the voltages of the applied signals. It is thus seen that the signal outputs of attenuation network 55 and detector 31 may be mixed by resistors 56 and 57 so that each contributes the same relative amount to the output signal appearing on terminal 59. In the case where the storage device of Fig. 1 is utilized to store a series of binary digits on a series of spots which have not been previously charged, or whose charges are no longer of interest, the voltage levels representing the binary digits to be stored may be taken, if needed elsewhere for computation purposes, directly from output conductor 52 of flip-flop 53.

Where the storage device is used to regenerate the spot charges, the signal appearing on terminal 59 is derived almost solely from the output conductor of attenuation network 55 since the triggering pulses appearing on the output conductor of detector 31 are of inconsequential duration. The voltage levels of the output signal in such a case will be of one-fourth the magnitude of the voltage levels appearing on the output conductor of attenuation network 55 owing to the action of mixing resistors 56 and 57 and the fact that no sustained signal is applied to resistor 57 from phase detector 31, and the signals will thus be seen to represent the previously stored binary digits.

Figure 4:
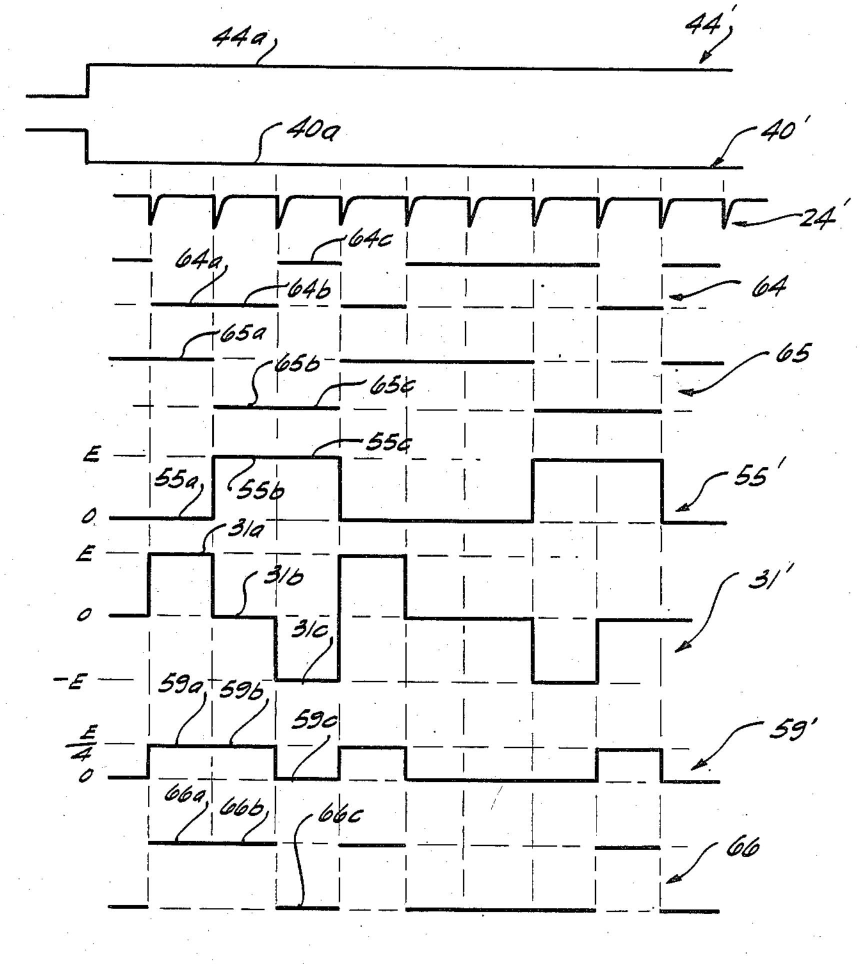

The last-named function of the storage device of Fig. 1 is that of storing a new series of binary digits in the form of charge levels on a series of spots previously charged to represent another series of binary digits, and deriving simultaneously therewith, voltage levels representing the previously stored binary digits. This operation is best understood by reference to the signal waveforms and patterns of Fig. 4. To carry out this function, flip-flop 39 has been triggered so that signal 44' is at high voltage level 44a and signal 40' is at low voltage level 40a. Gate circuits 46 and 47 are opened by high voltage level 44a of signal 44' while gate circuits 36 and 37 are closed, owing to low voltage level 40a of signal 40'. The original charges on a series of spots are illustrated by the charge levels of the pattern, generally designated 64 of Fig. 4, while the new charge levels which are to be placed on the same series of spots are illustrated by the pattern, generally designated 65 of Fig. 4. The signal, generally designated 55' of Fig. 4 is the output signal of flip-flop 41 after attenuation by network 55 and corresponds to the new charge pattern 65, in the sense heretofore noted. Signal 55' was derived from the output signal (not illustrated) of flip-flop 53 in the same manner as that illustrated and described in connection with the signals of Fig. 2 and reproduces the binary digits represented thereby.

During the first interpulse interval of signal 24', low voltage level 55a of signal 55' is impressed on coating 20 with the result that the first spot being scanned, of a negative charge level 64a, is discharged to positive charge level 65a of pattern 65. This change from negative to positive charge level produces a current flow in the primary winding of transformer 28, which in turn, produces a positive level 31a in the output signal, generally designated 31' in Fig. 4, of phase detector 31. Level 31a was, as originally derived from transformer 28, modulated at 30 megacycles and, after detection by detector 31, appears, as shown, as a direct current level of positive E volts. The reason for the positive polarity has been set forth previously in connection with the operation of the device in regenerating the charge levels of the spots. The first voltage level 59a of the signal, generally designated 59' in Fig. 4, appearing on output terminal 59 is one-fourth of the sum of level 31a of signal 31' and level 55a of signal 55', and thus, is of a relatively high voltage level of approximately E/4 volts.

During the second interpulse interval, high voltage level 55b of signal 55 is impressed on coating 20, and since the second spot scanned during this interval was originally at negative charge level 64b, the second spot does not change in charge. Hence, substantially no output signal is produced by detector 31, as is indicated by zero voltage level 31b of signal 31'. Thus, voltage level 59b of signal 59' during this time interval is derived solely from high voltage level 55b of signal 55', and is one-fourth of the magnitude thereof and equal, in magnitude, to level 59a.

During the next interpulse interval, the third spot scanned was originally at positive charge level 64c and is changed to negative charge level 65c of pattern 65 by the high voltage level 55c of signal 55'. This change of charge produces a negative voltage level 31c of signal 31', the change of charge being of opposite direction to that for the first spot contacted during the first interpulse interval. The magnitude of negative level 31c is equal to the magnitude of positive level 31a but of reversed polarity. The mixing of high voltage level 55c of signal 55' and negative voltage level 31c of signal 31' by resistors 56 and 57 produces a voltage level 59c of signal 59', level 59c being, in effect, a cancellation of negative level 31c and high voltage level 55c and being, accordingly, of a relatively low voltage level compared to levels 59a and 59b of signal 59'.

The remaining voltage levels of output signal 59' of Fig. 4 may be readily understood from the explanation set forth for the first three interpulse intervals. The signal, generally designated 66 of Fig. 4, illustrates the voltage levels which would have been produced on the output conductor of detector 31 from charge pattern 64 if no new charge pattern, such as that represented by pattern 65, had been simultaneously placed on layer 16. Signal 66, although not actually appearing in the device, serves to illustrate that output signal 59' corresponds to the voltage levels initially on layer 16. It is thus seen that output signal 59' represents the binary digits originally stored on layer 16.

Figure 5:
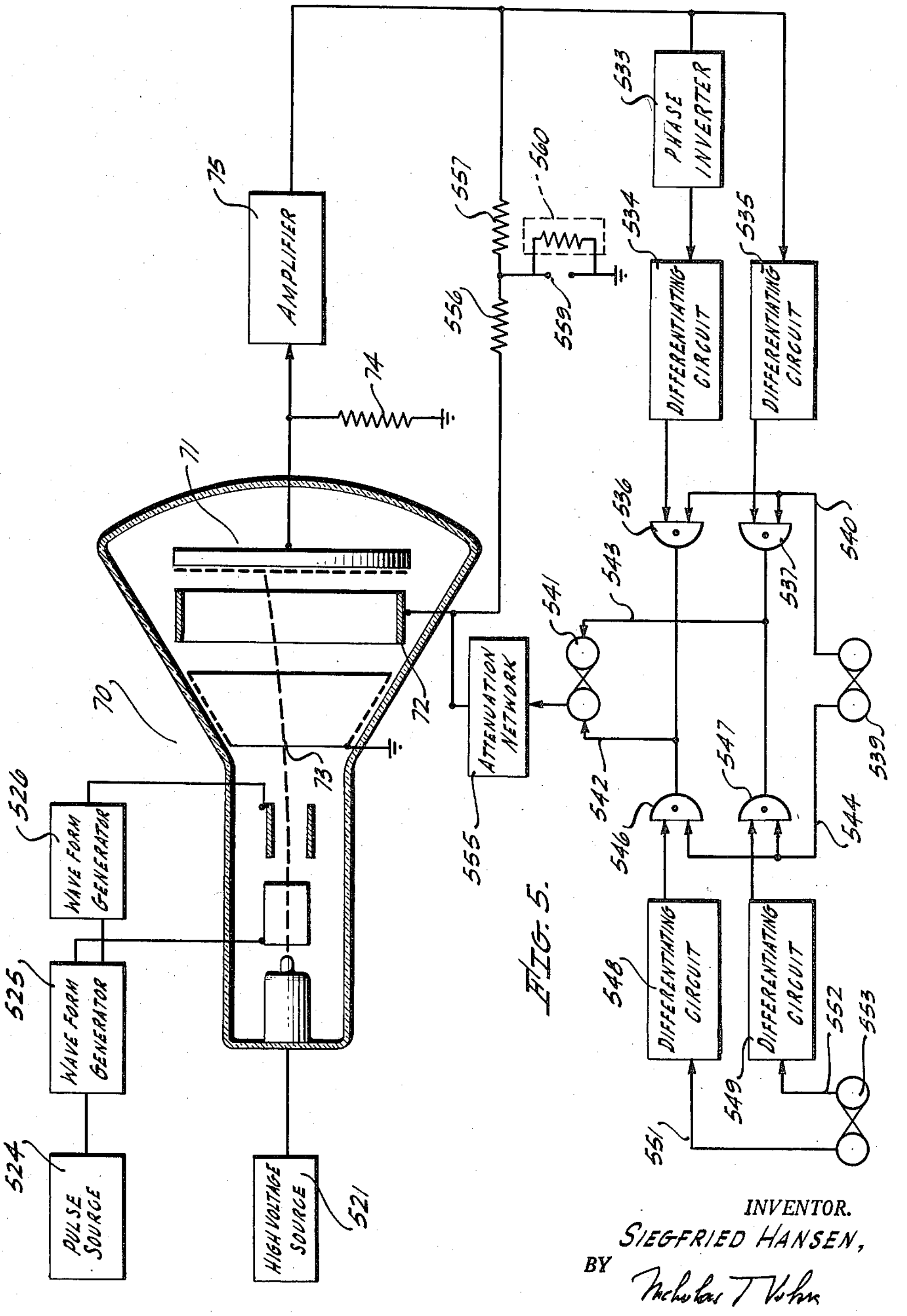
Fig. 5 is a circuit diagram of another embodiment according to the present invention.

Referring now to Fig. 5, there is herein illustrated another embodiment according to the present invention wherein the memory tube comprises a storage tube 70. Considerable circuitry of the storage device of Fig. 5 is identical to the circuitry provided for the device according to Fig. 1 and the corresponding circuit elements are given the same numerals as previously but preceded by the digit 5.

Storage tube 70 includes a collector electrode 72 and a target electrode 71 which has a thin layer of dielectric material mounted on a metal backing so as to face an electron beam 73. Electron beam 73 in this embodiment is unmodulated and is produced by a high voltage source 521 connected to the electron gun of tube 70. A deflection system, identical to that shown in Fig. 1, comprises a pulse source 524 and stepped waveform generators 525 and 526 which are coupled to the horizontal and vertical deflection plates, respectively, of tube 70 and cause beam 73 to strike the dielectric layer of target electrode 71 in a series of spots.

The output terminal of an attenuation network 555 is connected to collector electrode 72 while the metal backing of target electrode 71 is connected to ground through a resistor 74, the common junction of resistor 74 and electrode 71 being connected to the input terminal of an amplifier 75. Amplifier 75 is arranged, as for example, by having an odd number of stages, so as to invert the polarity of input signals between its input and output terminals. The output terminal of amplifier 75 is connected to the input terminal of a first differentiating circuit 534 through a phase inverter 533 and to the input terminal of a second differentiating circuit 535. A mixing resistor 557 is connected between the output terminal of amplifier 75 and output terminal 559.

The principle of operation of storage tube 70 is slightly different from that of cathode ray tube 11 of Fig. 1. If flip-flop 541 is producing its low voltage level, then a majority of the secondary emission electrons emitted from a given spot under bombardment by electron beam 73 will return to the spot from which they were liberated, there being no appreciable potential attraction on electrode 72. Thus, the given spot will, when beam 73 is removed, contain a surplus of electrons and hence exhibit a relatively negative charge. Under the same circumstances, if a high voltage level is produced by flip-flop 541, then a majority of the secondary emission electrons will be drawn to collector electrode 72 with the result that the given spot under bombardment will, when the electron beam is removed, contain a deficiency of electrons and hence exhibit a relatively positive charge. Thus, the main difference between the operation of cathode ray tube 11 of Fig. 1 and storage tube 70 of this embodiment lies in the fact that, in the former case, a high voltage level at flip-flop 41 produces a negatively charged spot, while in the latter case, a high voltage level at flip-flop 541 produces a positively charged spot.

The storage device, according to Fig. 5, may perform the identical functions as that described for the device according to Fig. 1. Thus, a series of binary digits may be stored on target electrode 71 as a series of charged spots, respectively, and the manner of operation of the storage device of Fig. 5 to perform this operation is substantially identical to that described in connection with the storage device of Fig. 1. For example, with flip-flop 539 producing its high voltage level on output conductor 544 and thereby opening gate circuits 546 and 547, the series of binary digits to be stored, as represented by the series of output voltage levels appearing on conductors 551 and 552 of flip-flop 553, are reproduced by the output voltage levels of flip-flop 541. With flip-flop 541 reproducing the series of output voltage levels of flip-flop 553, the series of spots contacted by beam 73 are charged in accordance therewith to store the binary digits represented thereby.

The second function capable of being performed by the storage device according to Fig. 5, is that of regenerating the charge on each of a series of spots, the spots having been previously charged to represent a series of binary digits. This function is performed when gate circuits 536 and 537 are opened by the production of a high voltage level signal on output conductor 540 of flip-flop 539. With this accomplished, if flip-flop 541 produces its low voltage level at the instant electron beam 73 contacts a spot having a positive charge, the given spot begins to absorb the emitted secondary emission electrons to assume the high voltage level of collector electrode 72 with the result that a corresponding electron flow from target electrode 71 to ground occurs through resistor 74. This current flow results from the fact that the surface of the dielectric layer on target electrode 71 behaves as one plate of a condenser plate, the absorption of the electrons by the given spot under the above-stated conditions driving, through condenser action; a corresponding number of electrons from the metal backing to ground. This current flow results in a negative voltage drop across resistor 74 which is amplified and inverted into a positive signal by amplifier 75. The positive amplified signal is inverted into a negative signal by inverter 533 and, after differentiation by differentiating circuit 534, triggers flip-flop 541 through its input conductor 542 into producing the appropriate high voltage level. The high voltage level, thus produced, returns the charge on the given spot back to its initial positive level.

If, on the other hand, flip-flop 541 were producing its high voltage level at the instant a spot contacted by beam 73 had a negative charge, then a signal of positive polarity would be produced across resistor 74, owing, again, to the condenser action between the surface of the dielectric layer and the metal backing of target electrode 71, since the spot would be, under the conditions stated, liberating electrons to collector electrode 72. This positive signal, in turn, after being inverted by amplifier 75 to a negative signal and the resulting negative signal after being differentiated by circuit 535, would trigger flip-flop 541, through its input conductor 543, into producing its low voltage level thereby allowing the spot being contacted by the beam to return to its initial negative charge.

If the output voltage level produced by flip-flop 541 corresponds to the charge level on the particular spot being bombarded, then the conduction state of flip-flop 541 is not changed and the spot assumes its exact initial charge as determined by the output voltage level of the flip-flop.

The final function capable of being performed by the device of Fig. 5 is that of storing a new series of binary digits while simultaneously producing an output signal representing the series of previously stored binary digits. This function is accomplished when flip-flop 539 is triggered to produce its high voltage level on output conductor 544 to thereby open gate circuits 546 and 547. The voltage levels appearing on output conductor 552 of flip-flop 553 and representing the new digits to be stored, are transferred, in the manner explained in connection with the device of Fig. 1, to corresponding voltage levels appearing on the output conductor of flip-flop 541.

If a given spot contacted by beam 73 has a charge level equal to the charge level corresponding to the new binary digit to be stored, then no output signal is produced across resistor 74 and the magnitude of the signal appearing on output terminal 559 is one-fourth of the value of the output signal of attenuation network 555 owing to the action of the mixing resistors 556 and 557 and output load resister 560. If the spot contacted by beam 73 was previously charged positively and a negative charge is to be placed thereon, then a signal of negative potential would be produced across resistor 74. The negative signal is amplified and inverted by amplifier 75 into a corresponding positive signal, which, when mixed by the mixing network with the attenuated low voltage level of flip-flop 541, as applied to the collector electrode, produces a relatively high voltage level on output terminal 559 thereby indicating the originally stored digit. However, if the spot were originally charged negatively and a positive charge were to be stored thereon representing the new binary digit, then a positive signal would be produced across resistor 74, which after inversion by amplifier 75 and mixing in the mixing network, results in an output signal on terminal 559 of a relatively low voltage level to thus indicate the digit originally stored.

As will be apparent to those skilled in the art, types of storage tubes other than those herein specifically illustrated, may be employed in the device according to the present invention. Also, types of mixing networks other than the resistor mixing network herein specifically illustrated may be employed without departing from the scope and spirit of the present invention, as defined in the appended claims.

What is claimed as new is:

1. In an electrostatic storage system including a memory tube having first and second electrodes, said first electrode having a spot thereon to be charged to one of two charge levels, the charge on said spot varying in accordance with the voltage level of the signal appearing on said second electrode, apparatus for selectively either regenerating the previous charge on said spot or storing a new charge on said spot, said apparatus comprising: actuable means responsive to successive input signals for producing an electrical signal having alternate high and low voltage levels corresponding to the two charge levels, respectively; means for applying said electrical signal to the second electrode; output means electrically coupled to one of the electrodes for producing an output signal when the charge level on the spot does not correspond to the voltage level of said electrical signal; first selectively operable means for applying said output signal to said actuable means to actuate said actuable means to produce the voltage level corresponding to the previous charge level on the spot; second selectively operable means coupled to said actuable means for actuating said actuable means to produce the voltage level corresponding to the new charge level for the spot; and means coupled to said first and second selectively operable means for selectively operating said first and second selectively operable means, whereby the previous charge level on the spot will either be regenerated or changed to the new charge level, respectively.

2. The system according to claim 1 wherein said memory tube comprises a cathode ray tube, said first electrode comprises a secondary emissive layer within said tube, and said second electrode comprises an external conductive coating adjacent the layer, said one electrode being said second electrode.

3. The system according to claim 1 wherein said memory tube comprises a storage tube, said first electrode comprises a target electrode, and said second electrode comprises a collector electrode, said one electrode being the target electrode.

4. The apparatus defined in claim 1, having, in addition, an output terminal; first means for applying said output signal to said output terminal; and second means for applying said electrical signal to said output terminal whereby the signal appearing on said output terminal represents the original charge on the spot during the operation of either of said first and second selectively operable means.

5. A circuit for use with a memory tube having first and second electrodes, said circuit selectively either regenerating the previous charge on a spot on the first electrode and producing an output signal representing the previous charge, or storing a new charge on the spot while simultaneously producing an output signal representing the previous charge, said spot having been previously charged to one of two charge levels, the charge on said spot being variable in accordance with the voltage level of the electrical signal appearing on the second electrode, said new charge being either of said two charge levels, said circuit comprising: actuable means having first and second input terminals and an output conductor, said actuable means being responsive to signals applied to said first and second input terminals for producing a first output signal having high and low voltage levels, respectively, on said output conductor, said high and low voltage levels corresponding to the two charge levels, respectively; means electrically coupling said output conductor to the second electrode; output means electrically coupled to one of the electrodes for producing a second output signal representing the change of charge on the spot; means for inverting said second output signal; first selectively operable means for applying said second output signal and the inverted second output signal to said first and second input terminals, respectively, of said actuable means to actuate said actuable means to set said first output signal to a voltage level corresponding to the previous charge on the spot; second selectively operable means coupled to said first and second input terminals for actuating said actuable means to set said first output signal to a voltage level corresponding to the new charge for the spot; means for selectively rendering operable said first and said second selectively operable means whereby the previous charge on the spot will either be regenerated or charged to the new charge, respectively; and means for combining said first and second output signals to produce an electrical signal representing the previous charge on the spot during the actuation either of said first or second selectively operable means.

6. The circuit according to claim 5 wherein said memory tube comprises a cathode ray tube, said first electrode comprises a secondary emissive layer within said tube, and said second electrode comprises an external conductive coating adjacent the layer, said one electrode being said second electrode.

7. The circuit according to claim 5 wherein said memory tube comprises a storage tube, said first electrode comprises a target electrode, and said second electrode comprises a collector electrode, said one electrode being the target electrode.

8. A circuit for use with a memory tube having first and second electrodes, said circuit selectively either regenerating the previous charge on a spot on the first electrode and producing an output signal representing the previous charge, or storing a new charge on the spot while simultaneously producing an output signal representing the previous charge, said spot charging and having been previously charged to one of two charge levels, the charge on the spot being variable in accordance with the voltage level of the electrical signal appearing on the second electrode, said circuit comprising: a bistable flip-flop having first and second input terminals and an output conductor, said flip-flop being responsive to signals applied to said first and second input terminals for producing a first electrical output signal having first and second voltage levels, respectively, on said output conductor; an attenuation network coupled between said output conductor and the second electrode for attenuating the first and second voltage levels of said first output signal to correspond to the two charge levels, respectively; output means electrically coupled to one of the electrodes for producing a second electrical output signal representing the change of charge on the spot; first means coupled to said output means for differentiating said second electrical output signal; second means coupled to said output means for inverting said second electrical output signal; third means coupled to said second means for differentiating the inverted second electrical output signal; first selectively operable means coupled to said first and second means for applying the differentiated second electrical output signal and the differentiated inverted second electrical output signal to said first and second input terminals, respectively, to set said first electrical output signal to a voltage level corresponding to the previous charge level on the spot; second selectively operable means coupled to said first and second input terminals for setting said first electrical output signal to a voltage level corresponding to the new charge for the spot; means coupled to said first and second selectively operable means for selectively rendering operable said first and said second selectively operable means, whereby the previous charge on the spot will either be regenerated or changed to the new charge, respectively; an output terminal; first resistor means electrically coupled between the second electrode and said output terminal; second resistor means; and means for electrically coupling said second resistor means between said one electrode and said output terminal, whereby the signal appearing on said output terminal represents the previous charge on the spot during the actuation of either of said first and second selectively operable means.

9. A circuit for use with a memory tube having first and second electrodes, said circuit charging a spot on the first electrode to either of two charge levels corresponding to two voltage levels, respectively, of an input signal, the charge on said spot being previously at one of the two charge levels and varying in accordance with the voltage level of the electrical signal appearing on the second electrode, said circuit producing an output signal representing the previous charge and comprising: input means of applying the input signal to the second electrode; output means electrically coupled to one of the electrodes for producing an output signal representing the change of charge on the spot in response to the applied input signal; and means coupled to said input means and to said output means for combining the output signal and the input signal to produce an electrical signal representing the original charge on the spot.

10. A circuit for use with a memory tube having first and second electrodes, said circuit storing a new charge on a spot on the first electrode, the charge of said spot varying in accordance with the voltage level of the electrical signal appearing on said second electrode, said spot having been previously charged to one of two charge levels, said circuit producing an output signal representing the previous charge and comprising: a flip-flop having an output conductor, said flip-flop producing an output signal having either a first or a second output voltage level on said output conductor; an attenuation network conductively coupled between said output conductor and the second electrode for attenuating the first and second output voltage levels of said flip-flop to correspond to the two charge levels, respectively; input means coupled to said flip-flop for triggering said flip-flop so that the output voltage level of said output signal corresponds to the new charge to be stored on the spot; output means electrically coupled to one of the electrodes for producing an output signal representing the change of charge on the spot; an output terminal; first and second resistors; means electrically coupling one end of each of said first and second resistors to said output terminal; means electrically coupling the other end of said first resistor to the second electrode; and means electrically coupling said one electrode to the other end of said second resistor whereby the voltage level of the signal appearing on said output terminal represents the original charge on the spot.

11. A circuit for use with a cathode ray tube having a secondary emissive layer and an external conductive coating adjacent the layer, said circuit being adapted to store a new charge on a spot on the layer, the charge on said spot varying in accordance with the voltage appearing on the conductive coating, said spot having been previously charged, said circuit comprising: input means for applying a first electrical signal having a voltage level corresponding to the new charge to the conductive coating; output means electrically coupled to the conductive coating for producing a second electrical signal representing the change of charge on the spot in response to said first electrical signal; and means coupled to said input means and to said output means for combining said first and second electrical signals to produce an electrical output signal representing the original charge on the spot.

12. A circuit for use with a cathode ray tube having a phosphorescent layer, an external conductive coating adjacent the layer, and means for producing an electron beam current modulated by a radio-frequency signal, said circuit storing a new charge on a spot on the layer, the charge on the spot varying in accordance with the voltage level of the electrical signal appearing on the conductive coating, said spot having been previously charged to one of two charge levels, said circuit producing an output signal representing the previous charge and comprising: means for applying a first electrical signal having a voltage level corresponding to the new charge for the spot to the conductive coating; output means electrically coupled to the conductive coating for producing a second electrical signal representing the change of charge on the spot as modulated at the frequency of the radio-frequency signal; detector means electrically coupled to said output means for producing a third electrical signal corresponding to the envelope of the modulated signal; an output terminal; first resistor means for applying said third electrical signal to said output terminal; and second resistor means for applying said first electrical signal to said output terminal whereby the voltage level of the signal appearing on said output terminal represents the previous charge on the spot.

13. A circuit for use with a cathode ray tube having a phosphorescent layer, an external conductive coating adjacent the layer, and means for producing an electron beam current modulated by a radio-frequency signal, said circuit storing a new charge of one of two charge levels on a spot on the layer, the charge of said spot varying in accordance with the voltage level of the signal appearing on the conductive coating, said spot having been previously charged to one of said two charge levels, said circuit producing an output signal representing the previous charge and comprising: a flip-flop having an output conductor and producing an output signal having either a first or a second output voltage level on said output conductor; an attenuation network electrically coupled between said output conductor and the conductive coating for attenuating the first and second output voltage levels of said flip-flop output signal to correspond to the two charge levels, respectively; a transformer having a primary and a secondary winding; means for coupling said primary winding to the conductive coating, the signal appearing across said secondary winding representing the change of charge on the spot modulated at the frequency of the radio-frequency signal; a phase detector having a pair of input circuits and an output circuit, said phase detector being responsive to unmodulated and modulated signals of identical carrier frequencies applied to said input circuits for producing a signal representing the envelope of the modulated signal across said output circuit; a radio-frequency amplifier electrically coupled between said secondary winding and one input circuit of said phase detector; means for applying the radio-frequency signal to the other input circuit of said phase detector whereby the signal appearing across the output circuit of said phase detector represents the change of charge on the spot; an output terminal; first resistor means electrically coupled between the conductive coating and said output terminal; and second resistor means electrically coupled between the output circuit of said phase detector and said output terminal whereby the signal appearing on said output terminal represents the previous charge on the spot.

14. A circuit for use with a storage tube having target and collector electrodes, said circuit charging a spot on the target electrode to one of two charge levels corresponding to the voltage level of an input signal, applied to the collector electrode, said spot having been previously charged to one of said two charge levels, said circuit comprising: input means for applying the input signal to the collector electrode; output means electrically coupled to said target electrode for producing an output signal representing the change of charge level on the spot in response to the applied input signal; and means coupled to said input means and to said output means for combining the output signal and the input signal to produce an electrical signal representing the original charge level on the spot.

15. A circuit for use with a storage tube having a collector and a target electrode, said circuit storing a new charge on a spot on the target electrode, the charge on said spot varying in accordance with the voltage level of the signal appearing on the collector electrode, said spot having been previously charged to one of said two charge levels, said circuit producing an output signal representing the previous charge level on the spot and comprising: a flip-flop having an output conductor, said flip-flop producing a first electrical signal having either a first or a second output voltage level on said output conductor; an attenuation network electrically coupled between said output conductor and the collector electrode for attenuating the first and second output voltage levels of said first electrical signal to correspond to the two charge levels, respectively; means for triggering said flip-flop so that the output voltage level of said first electrical signal corresponds to the new charge level to be stored on the spot; resistor means electrically coupled to said target electrode, the signal appearing across said resistor means representing the change of charge level on the spot; an output terminal; first and second resistors; means electrically coupling one end of each of said first and second resistors to said output terminal; means electrically coupling the other end of said first resistor to the collector electrode; and means electrically coupling the target electrode to the other end of said second resistor whereby the signal appearing on said output terminal represents the previous charge level on the spot.

16. A circuit for use with a memory tube having first and second electrodes, said circuit regenerating the charge on a spot on the first electrode, the charge on said spot varying in accordance with the voltage level of the signal appearing on the second electrode, said spot having been previously charged to one of two charge levels, said circuit comprising: actuable means responsive to successive input signals for producing a first electrical signal having alternate first and second voltage levels corresponding to the two charge levels, respectively; means for applying said first electrical signal to the second electrode; output means electrically coupled to one of the electrodes for producing an output signal when the previous charge on the spot does not correspond to the voltage level of said first electrical signal; and means for applying the output signal to said actuable means to actuate said actuable means to produce the voltage level corresponding to the previous charge level on the spot.

17. A circuit for use with a memory tube having first and second electrodes, said circuit regenerating the charge on a spot on the first electrode, the charge on said spot varying in accordance with the voltage level of the signal appearing on the second electrode, said spot having been previously charged to one of two charge levels, said circuit comprising: actuable means having first and second input conductors and an output conductor and responsive to signals applied to said first and second input conductor for producing a first electrical output signal having first and second voltage levels, respectively, said first and second voltage levels corresponding to the two charge levels, respectively; means electrically coupling said output conductor to the second electrode; output means electrically coupled to one of the electrodes for producing a second electrical output signal representing the change of charge on the spot; first means for applying said second electrical output signal to said first input conductor; means for inverting said second electrical output signal; means for applying the inverted second electrical output signal to said second input conductor whereby said actuable means is actuated to produce a third electrical output voltage level corresponding to the previous charge level on the spot.

18. A circuit for use with a memory tube having first and second electrodes, said circuit regenerating the charge on a spot on the first electrode, the charge on said spot varying in accordance with the voltage level of the signal appearing on the second electrode, said spot having been previously charged to one of two charge levels, said circuit comprising: a bistable flip-flop having first and second input conductors and an output conductor, said flip-flop being responsive to signals applied to said first and second input conductors for producing on said output conductor a first electrical output signal having first and second voltage levels, respectively; an attenuation network coupled between said output conductor and the second electrode for attenuating the first and second voltage levels of said first output signal to correspond to the two charge levels, respectively; output means electrically coupled to one of the electrodes for producing a second electrical output signal representing the change of charge on the spot; first means for differentiating said second electrical output signal; means for inverting said second electrical output signal; second means for differentiating the inverted second electrical output signal; and means for applying the differentiated second electrical output signal and the differentiated inverted second electrical output signal to said first and second input conductors, respectively, to produce on said output conductor an output signal having a voltage level corresponding to the previous charge on the spot.

19. A circuit for regenerating the charge on a spot on the secondary emissive layer of a cathode ray tube, said tube having, in addition, an external conductive coating adjacent the layer, the charge on said spot varying in accordance with the voltage level of the signal appearing on the conductive coating, said spot having been previously charged to one of two charge levels, said circuit comprising: actuable means responsive to successive input signals for producing a first electrical signal having alternate first and second voltage levels, said first and second voltage levels corresponding to the two charge levels, respectively; means for applying said first electrical signal to the conductive coating; output means electrically coupled to the conductive coating for producing a second electrical signal when the voltage level of said first electrical signal does not correspond to the previous charge level on the spot; and means for applying said second electrical signal to said actuable means to actuate said actuable means into producing an output voltage level corresponding to the previous charge on the spot.

20. A circuit for use with a cathode ray tube having a phosphorescent layer, means for producing an electron beam current modulated by a radio-frequency signal, and an external conductive coating adjacent the layer, said circuit regenerating the charge on a spot on the layer, the charge on said spot varying in accordance with the voltage level of the signal appearing on the conductive coating, said spot having been previously charged to either of two charge levels, said circuit comprising: actuable means having first and second input conductors and an output conductor and being responsive to signals applied to said first and second input conductors for producing a first electrical signal having first and second voltage levels, respectively, on said output conductor, said first and second voltage levels corresponding to the two charge levels, respectively; a transformer having primary and secondary windings; means coupling said output conductor and said primary winding to the conductive coating, the signal appearing across the secondary winding of said transformer representing the change of charge on the spot modulated at the frequency of the radio-frequency signal; detector means coupled to said secondary winding for producing a second electrical signal representing the envelope of the modulated signal; means for inverting said second electrical signal; and means for applying said second electrical signal and the inverted second electrical signal to said first and second input conductors, respectively, to produce on said output conductor a signal having a voltage level corresponding to the previous charge on the spot.

21. A circuit for use with a cathode ray tube having a layer, an external conductive coating adjacent the phosphorescent layer, and an electron beam current modulated by a radio-frequency signal, said circuit regenerating the charge on a spot on the layer, the charge on said spot varying in accordance with the voltage level of the signal appearing on the conductive coating, said spot having been previously charged to one of two charge levels, said circuit comprising: a bistable flip-flop having first and second input conductors and an output conductor; an attenuation network coupled between said output conductor and the conductive coating; a transformer having primary and secondary windings; means electrically coupling said primary winding to said conductive coating, the signal appearing across said secondary winding representing the change of charge on the spot modulated at the frequency of the radio-frequency signal; a phase detector having a pair of input circuits and an output circuit, said phase detector being responsive to unmodulated and modulated signals of identical carrier frequencies applied to the input circuits thereof for producing an electrical output signal representing the envelope of the modulated signal on the output circuit thereof; means for coupling said secondary winding to one input circuit of said phase detector; means for applying the radio-frequency signal to the other input circuit of said phase detector whereby the signal on the output circuit of said phase detector represents the change of charge on the spot; first differentiating means electrically coupled between the output circuit of said phase detector and the first input conductor of said flip-flop; and second differentiating means electrically coupled between the output circuit of said phase detector and the second input conductor of said flip-flop, said second differentiating means including a serially-connected phase inverter, said flip-flop being operable in response to signals applied to said first and second input conductor to produce an output signal having a voltage level corresponding to the previous charge on the spot.

22. A circuit for regenerating the charge on a spot on the target electrode of a storage tube, said storage tube having, in addition, a collector electrode, the charge on said spot varying in accordance with the voltage level of the signal appearing on the collector electrode, said spot having been previously charged to one of two charge levels, said circuit comprising: actuable means electrically coupled to the collector electrode and responsive to successive input signals for producing an electrical signal having alternate first and second voltage levels corresponding to the two charge levels, respectively; output means electrically coupled to the target electrode for producing a first output signal representing the change of charge on the spot; and means for applying said first output signal to said actuable means to actuate said actuable means to make the voltage level of said electrical signal correspond to the previous charge on the spot.

23. A circuit for regenerating the charge on a spot on the target electrode of a storage tube, said storage tube having, in addition, a collector electrode, the charge on said spot varying in accordance with the voltage appearing on the collector electrode, said spot having been previously charged to one of two charge levels, said circuit comprising: actuable means having first and second input conductors and an output conductor and responsive to signals applied to said first and second input conductors for producing an electrical signal having first and second voltage levels, respectively, on said output conductor, said first and second voltage levels corresponding to the two charge levels, respectively; means electrically coupling said output conductor to the collector electrode; output means electrically coupled to the target electrode for producing an output signal representing the change of charge on the spot; first means for applying the output signal to said first input conductor; and second means for inverting the output signal and applying the inverted output signal to said second input conductor whereby the electrical signal from said actuable means has a voltage level corresponding to the previous charge on the spot.

24. A circuit for regenerating the charge on a spot on the target electrode of a storage tube, said storage tube having, in addition, a collector electrode, the charge on the spot varying in accordance with the voltage appearing on the collector electrode, said spot having been previously charged to one of two charge levels, said circuit comprising: a bistable flip-flop having first and second input conductors and an output conductor; attenuation means coupled between said output conductor and the collector electrode; an output circuit electrically coupled to the target electrode for producing an electrical output signal representing the change of charge on the spot; first means for applying the output signal to said first input conductor; and second means for inverting the output signal and applying the inverted signal to said second input conductor, said flip-flop producing an output signal having a voltage level corresponding to the previous charge on the spot.

References Cited in the file of this patent

UNITED STATES PATENTS

| | | |
|---|---|---|
| 2,527,652 | Pierce | Oct. 31, 1950 |
| 2,572,586 | Barney | Oct. 23, 1951 |
| 2,589,460 | Tuller | Mar. 18, 1952 |
| 2,639,425 | Russell et al. | May 19, 1953 |